April 16, 1957 E. KOHRING 2,788,565
AUTOMATIC MULTIPLE SPINDLE LATHE
Filed May 29, 1951
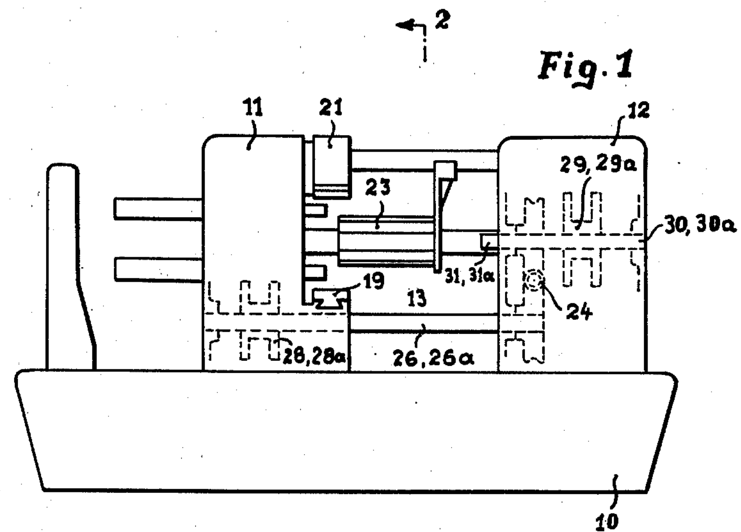
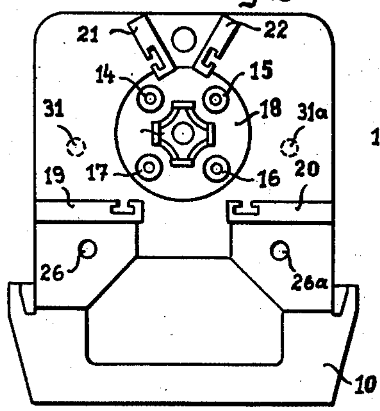
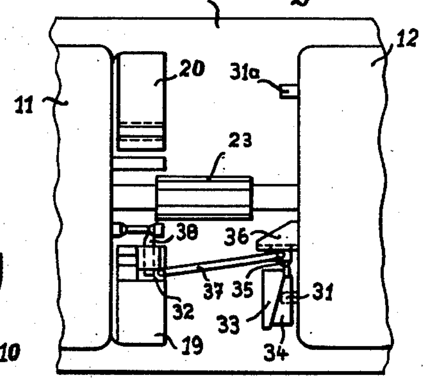
INVENTOR
Erwin Kohring
BY Richard Lowe [signature]
AG'T United States Patent Office 2,788,565 Patented Apr. 16, 1957

2,788,565

AUTOMATIC MULTIPLE SPINDLE LATHE

Erwin Kohring, Koln-Deutz, Germany, assignor to Alfred H. Schütte, Koln-Deutz, Germany, a German company Application May 29, 1951, Serial No. 228,819

Claims priority, application Germany September 9, 1950

1 Claim. (Cl. 29—37)

This invention relates to an automatic multiple spindle lathe.

The primary object of my invention is to generally improve lathes of the kind referred to.

In designing automatic multiple lathes, it is customary to arrange the spindle drum with the work spindles in the so-called spindle head at one end of the machine whereas at the other end of the working space a box is located which contains most of the gears and controlling mechanisms for the movement of the tools. The number of tools is generally limited. However, the usefulness of automatic machines of the kind referred to increases with the number of tools which can be made to operate simultaneously, and also with the variety of movements possible with such tools.

One object of my invention is to provide an automatic multiple spindle lathe which permits the control of tools in addition to the tool slides actuated by permanent cam shafts. Another object of my invention is to synchronize the operation of such additional tools with the normal operating cycle of the machine. This would not be the case if, for example, the additional tools were actuated by special drives.

To the accomplishment of the foregoing and other objects which will hereinafter appear, my invention consists in the machine elements and their relation one to the other, as hereinafter are more particularly described in the specification and sought to be defined in the claim. The specification is accompanied by a drawing in which:

Fig. 1 is a front elevation of an automatic four spindle lathe embodying features of my invention;

Fig. 2 is a section taken approximately in the plane of the line 2—2 of Fig. 1; and Fig. 3 is a plan view, with parts omitted.

Referring to the drawing in greater detail, the main parts of the automatic four spindle lathe selected for illustration are the pan 10, the spindle head 11, and the drive box 12. Between the spindle head and the drive box is the working space 13.

The pieces of work are clamped to the spindles 14, 15, 16 and 17 of the spindle drum 18 and are machined by tools held in horizontal cross slides 19 and 20 and in upper cross slides 21 and 22. There is also a head 23 which is located axially with respect to the spindle drum 18 and serves to hold tools for longitudinal machining.

The cross slides are moved by a driving mechanism 24 inside the drive box over shafts 26 and 26*a* and cams 28 and 28*a* located in the spindle head. Tools guided along the head 23 are actuated by cams 29 and 29*a*, the latter cams being carried by cam shafts 30 and 30*a* which are also driven from the shaft 24.

In accordance with my invention, free ends of the shafts 30 and 30*a* extend through the wall of the drive box at 31 and 31*a*, respectively, into the working space 13. Cams for operating any desired special tools are fastened to these protruding shaft butts which run synchronously with the other operating means 28, 29. Tools for pieces of work clamped to the spindles 14 and 17 are actuated over the rotating butt 31, and the actuating device which is connected to the butt 31*a* is intended to operate additional tools for pieces of work clamped in the positions 15 and 16.

From Fig. 2 it can be seen that the shaft butts 31 and 31*a*, shown in dotted lines, do not reduce the working space. Free dropping of chips is not interfered with by the butts 31 and 31*a* any more than by the cam shafts 26 and 26*a*. The working space remains free.

Referring to Fig. 3, to show the working space of the machine in a clearer view, the upper cross slides 21 and 22 are omitted. On the lower cross slide 19 there is an additional longitudinal tool slide 32, the longitudinal movement of which is controlled from the shaft butt 31 which carries a cam 33 with the cam face 34. The cam 33 cooperates with a cam follower 35 which slides in a bracket 36 mounted on the drive box 12. The cam follower 35 and the longitudinal tool slide 32 are linked by a connecting rod 37.

In Fig. 3, the machining of a cylindrical portion of a reduced diameter is shown as an example. The sequence of operations is as follows: First the cross slide 19 is moved towards the work so that a cutting tool 38 cuts into the work. During this period, no longitudinal movement is effected by the shaft butt 31. Only when the desired cutting depth is reached and after the cross slide 19 has stopped, the longitudinal tool slide 32 is moved by the cam 34.

As described above, the cam shafts 26, 26*a* and the shaft butts 31 and 31*a* are operated synchronously. It is, therefore, possible to combine transverse and longitudinal movements in any desired manner. It is also possible, for instance, to machine stepped pieces of work. It is obvious that the same or similar devices can readily be installed on the cam shaft butt 31*a* and the rear cross slide 20.

From the foregoing it will be seen that my invention provides shaft butts which extend into the working space between the spindle head and the drive box of an automatic multiple spindle lathe and rotate synchronously with the cam shafts of the machine. These butts actuate additional tools by control means of any suitable kind. I prefer to extend the cam shafts located in the drive box through the wall of the box just far enough to allow for a cam or any other suitable device to be firmly fastened on the end of a shaft protruding into the space between the spindle head and drive box. The protruding end portions of the cam shafts or the shaft butts serve to feed additional tools toward and away from the work. When the feed of additional tools is controlled in such a way, the additional tools are automatically synchronized with the normal operating cycle of the machine.

It is advisable to locate the shaft butts, if possible, in the same height as the spindle drum axis and equidistant from this axis with respect to the front and back of the machine. It is then possible to use an additional tool for the work in any spindle position.

My additional tool devices may be of any suitable kind. It is possible to actuate from the shaft butts additional cross and/or longitudinal tool slides, such as feeding, slitting, milling, transverse drilling and other tools.

It will be apparent that while I have shown and described my invention in a preferred form, many changes and modifications may be made without departing from the spirit of the invention defined in the following claim.

I claim:

An automatic multiple spindle lathe, comprising a spindle head, a drive box spaced from said head to define a working space therebetween, a drive shaft in said drive box, at least one laterally movable tool slide disposed adjacent said head and carrying a longitudinally movable tool slide, at least one first cam shaft extending between said drive box and spindle head and carrying a cam in the latter for controlling the feeding movement of said laterally movable tool slide, at least one second cam shaft rotatably mounted in said drive box and carrying cams within the latter for the operation of tools employed in the longitudinal machining of work pieces carried by said spindle head, transmission means in said drive box between said drive shaft and said first and second cam shafts, said second cam shaft being parallel to said first cam shaft and spaced radially from the latter, the end of said second cam shaft which extends toward said head projecting freely from said drive box into said working space and terminating close to said drive box to provide a cam shaft butt, a cam on said butt within the working space, and means controlled by said cam on the butt and connected to said longitudinally movable tool slide to effect longitudinal movement of the latter in synchronism with the movement of said laterally movable tool slide by said cam on the first cam shaft.

References Cited in the file of this patent

UNITED STATES PATENTS

| | | |
|---|---|---|
| 1,320,609 | Drissner | Nov. 4, 1919 |
| 2,327,279 | Mansfield | Aug. 17, 1943 |
| 2,340,538 | Kohring | Feb. 1, 1944 |
| 2,657,453 | Brodhun | Nov. 3, 1953 |